(12) United States Patent
Waugh

(10) Patent No.: US 10,057,426 B2
(45) Date of Patent: Aug. 21, 2018

(54) SPEAKER PRIORITY FOR CONFERENCE CALLS

(71) Applicant: Red Hat, Inc., Raleigh, NC (US)

(72) Inventor: Timothy Waugh, Bournemouth Dorset (GB)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 15/381,862

(22) Filed: Dec. 16, 2016

(65) Prior Publication Data

US 2018/0176384 A1    Jun. 21, 2018

(51) Int. Cl.
*H04M 3/56* (2006.01)
*H04N 7/14* (2006.01)
*H04N 7/15* (2006.01)

(52) U.S. Cl.
CPC .......... *H04M 3/566* (2013.01); *H04M 3/567* (2013.01); *H04N 7/147* (2013.01); *H04N 7/15* (2013.01); *H04M 2203/5072* (2013.01)

(58) Field of Classification Search
CPC .................................................. H04M 3/566
See application file for complete search history.

(56) References Cited

U.S. PATENT DOCUMENTS

| | | | | |
|---|---|---|---|---|
| 7,006,617 B1 * | 2/2006 | Dal Farra | ............... | H04M 3/56 370/276 |
| 7,319,745 B1 * | 1/2008 | Firestone | ............ | H04M 3/2218 370/260 |
| 8,290,134 B2 | 10/2012 | Jaiswal et al. | | |
| 8,363,808 B1 * | 1/2013 | Bland | ................... | H04M 3/566 370/261 |
| 8,447,023 B2 | 5/2013 | Nimri et al. | | |
| 8,929,529 B2 | 1/2015 | Beerse et al. | | |
| 9,300,810 B2 | 3/2016 | Gorti et al. | | |
| 2002/0119795 A1 * | 8/2002 | Dorenbosch | ............ | H04M 3/56 455/509 |
| 2002/0173326 A1 * | 11/2002 | Rosen | ..................... | H04M 3/42 455/518 |

(Continued)

OTHER PUBLICATIONS

*Setting Conferences for Telepresence Mode (AVC CP)*, Oct. 31, 2016; http://documents.polycom.com/documents/video/platform-uc-infrastructure/realpresence-collaboration-server/realpresence-collaboration-server-rmx1800-7.

(Continued)

*Primary Examiner* — Jenee Holland
(74) *Attorney, Agent, or Firm* — Haynes and Boone, LLP

(57) ABSTRACT

An example method for managing a conference call includes detecting multiple concurrent audio signals. The multiple concurrent audio signals include a first audio signal from a first participant on a conference call and a second audio signal from a second participant on the conference call. The example method also includes comparing a first cumulative time period in which the first participant has spoken to a second cumulative time period in which the second participant has spoken on the conference call. The example method further includes selecting, based on the comparison, one of the first participant and the second participant as a lower ranked participant. The example method also includes providing an indication to the lower ranked participant to yield speaking in favor of another participant on the conference call.

20 Claims, 5 Drawing Sheets

(56) References Cited

U.S. PATENT DOCUMENTS

| | | | |
|---|---|---|---|
| 2003/0016632 A1* | 1/2003 | Refai | H04M 3/56 370/260 |
| 2004/0172252 A1* | 9/2004 | Aoki | H04M 3/564 704/270 |
| 2007/0121859 A1* | 5/2007 | Smelyansky | H04M 3/56 379/158 |
| 2007/0154006 A1* | 7/2007 | Onodera | H04M 3/42221 379/265.01 |
| 2007/0263805 A1 | 11/2007 | McDonald | |
| 2007/0263821 A1* | 11/2007 | Shaffer | H04M 3/42187 379/202.01 |
| 2008/0076391 A1* | 3/2008 | Chen | H04M 3/56 455/411 |
| 2008/0101575 A1* | 5/2008 | Amador | H04M 3/42187 379/202.01 |
| 2009/0028316 A1* | 1/2009 | Jaiswal | H04M 3/566 379/202.01 |
| 2009/0129295 A1* | 5/2009 | Shibata | H04M 3/56 370/260 |
| 2011/0075820 A1* | 3/2011 | Mikan | H04L 12/6418 379/88.13 |
| 2012/0002001 A1* | 1/2012 | Prentice | H04N 7/147 348/14.08 |
| 2012/0077536 A1* | 3/2012 | Goel | H04L 65/4061 455/518 |
| 2012/0207295 A1* | 8/2012 | Krutsch | H04M 3/569 379/202.01 |
| 2014/0108499 A1 | 4/2014 | Midtun | |
| 2015/0111615 A1* | 4/2015 | Chu | H04M 3/2236 455/563 |
| 2015/0341498 A1 | 11/2015 | Dickins et al. | |
| 2016/0127474 A1* | 5/2016 | Sharma | H04L 67/14 709/228 |
| 2016/0149968 A1 | 5/2016 | Yin et al. | |

OTHER PUBLICATIONS

*Adding and Sending a Notification*, Nov. 1, 2016, https://manager.everbridge.net/statics/WebHelp/MN_User/MN_User_03_Universe/Adding_and_Sending_a_Notification.htm.

*High Density IP Voice Conferencing Software*, Oct. 31, 2016, http://www.adaptivedigital.com/product/telephony/conferencing-software.htm.

* cited by examiner

SPEAKER PRIORITY FOR CONFERENCE CALLS

FIELD OF DISCLOSURE

The present disclosure generally relates to telecommunications and more specifically to managing conference calls.

BACKGROUND

Conference calls allow multiple participants to communicate simultaneously from multiple remote locations. The number of participants on a conference call can range from three into the hundreds. Conferencing solutions may be arranged in such a way that participants on the conference call connect to a service, which combines their audio and/or video and routes it back to the participants.

BRIEF SUMMARY

Methods, systems, and techniques for managing a conference call are provided. An example method for managing a conference call includes detecting multiple concurrent audio signals. The multiple concurrent audio signals include a first audio signal from a first participant on a conference call and a second audio signal from a second participant on the conference call. The example method also includes comparing a first cumulative time period in which the first participant has spoken on the conference call to a second cumulative time period in which the second participant has spoken on the conference call. The example method further includes selecting, based on the comparison, one of the first participant and the second participant as a lower ranked participant. The example method also includes providing an indication to the lower ranked participant to yield speaking in favor of another participant on the conference call.

An example system for managing a conference call includes a timekeeping module that maintains a first cumulative time period indicating how long a first participant has spoken on a conference call and maintains a second cumulative time period indicating how long a second participant has spoken on the conference call. The example system also includes a selection module that detects concurrent audio signals associated with the first and second participants, selects, based on the first cumulative time period and the second cumulative time period, one of the first participant and the second participant as a lower ranked participant, and provides an indication to the lower ranked participant to yield speaking in favor of another participant on the conference call.

An example machine-readable medium includes a plurality of machine-readable instructions that when executed by one or more processors is adapted to cause the one or more processors to perform a method including: detecting multiple concurrent audio signals, the multiple concurrent audio signals including a first audio signal from a first participant on a conference call and a second audio signal from a second participant on the conference call; comparing a first cumulative time period in which the first participant has spoken on the conference call to a second cumulative time period in which the second participant has spoken on the conference call; selecting, based on the comparison, one of the first participant and the second participant as a lower ranked participant; and providing an indication to the lower ranked participant to yield speaking in favor of another participant on the conference call.

Figure 1:
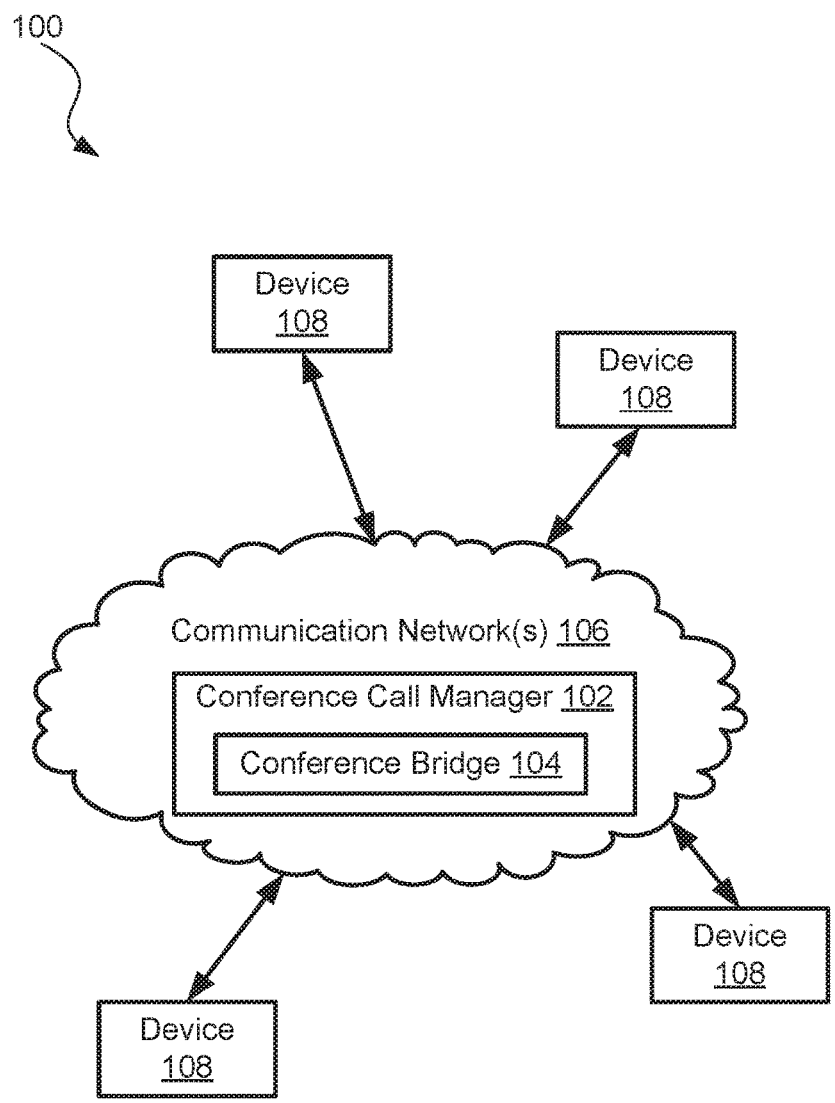
FIG. 1 depicts an example communication system for managing conference calls in accordance with one or more aspects of the present disclosure.

Examples of the present disclosure and their advantages are best understood by referring to the detailed description that follows.

DETAILED DESCRIPTION

In the following description, specific details are set forth describing some examples consistent with the present disclosure. It will be apparent, however, to one skilled in the art that some examples may be practiced without some or all of these specific details. The specific examples disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one example may be incorporated into other examples unless specifically described otherwise or if the one or more features would make an example non-functional.

During a conference call with participants widely dispersed, the latency between speaking and being heard means that two or more participants may speak and be heard by the other participants simultaneously, each participant believing s/he spoke before anyone else. This leads to a negotiation between the participants, each participant trying to give (or take) priority. The latency that caused the problem in the first place, however, means that the same problem happens during this negotiation phase, wasting time and leading to awkwardness and frustration. Human actors are generally polite and will attempt to give way to another speaker if they can; however two human actors attempting to do this with a time delay is not effective. Alternatively, some human actors are aggressive and frequently interrupt others. When a voice collision occurs between participants, it may take several seconds to determine who has priority among the participants to speak.

A solution that may overcome this problem of voice collisions on the conference call and the time it takes to mediate them may include keeping track of a cumulative time period in which each participant has spoken on the conference call. If a voice collision between participants is detected, the conference call manager may implement a fairness technique that determines which of these participants has spoken the least on the conference call. The conference call manager may then provide an indication to the other participants to yield speaking in favor of this participant.

The present disclosure provides techniques for managing conference calls. Unless specifically stated otherwise, as apparent from the following discussion, it is appreciated that throughout the description, discussions utilizing terms such as "determining," "detecting," "sending," "receiving,"

"comparing," "selecting," "providing," "storing," "identifying," "maintaining," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

FIG. 1 depicts an example communication system 100 for managing conference calls in accordance with one or more aspects of the present disclosure. A conference call is designed to allow multiple participants to listen and/or speak on the call. The conference call may be, for example, a video conference call or a telephonic conference call. Conferencing solutions are often arranged in such a way that there is a service which all participants connect to, and which combines their audio and/or video and routes it back to the participants. To enable a plurality of participants to join a conference call and to manage one or more ranking policies, communication system 100 includes a conference call manager 102, which is described in greater detail below in connection with FIG. 2.

Conference call manager 102 may be assigned a telephone number, a web address (e.g., Hypertext Transfer Protocol (HTTP)), and/or an Internet Protocol (IP) address. Further, conference call manager 102 may include or be communicatively coupled to a conference bridge 104 to permit the participants at the same and/or diverse locations to be connected to the conference call. Conference bridge 104 allows a group of people to participate in the conference call. In an example, conference bridge 104 allows participants to dial into a virtual meeting room from their own devices 108 (e.g., landline telephone, cellular telephone, desktop computer, tablet computer, etc.). A virtual meeting room may hold dozens or even hundreds of participants.

A conference call participant employs a device to join the conference call. In an example, a participant may dial a call-in telephone number, which may be dialed by all potential participants and is, thus, referred to as a "conference call telephone number" or, "call-in telephone number" or more succinctly, a "common telephone number." In another example, a participant may user a computing device executing a Web browser and point the Web browser to a uniform resource locator (URL) that joins the participant to the conference call.

One or more devices 108 may be connected to one or more communication networks 106. A communication network 106 is implemented in accordance with, for example, one or more past, current, and/or future standards such as the 3rd Generation Partnership Program (3GPP) Internet Multimedia Subsystem (IMS) standard(s) and/or specification(s). Each of networks 106 may be associated with a different service provider or two or more may be associated with the same service provider.

Communication network 106 may be a private network (e.g., local area network (LAN), wide area network (WAN), intranet, etc.), a public network (e.g., the Internet), or a combination thereof. The network may include various configurations and use various protocols including virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, Wi-Fi and Hypertext Transfer Protocol (HTTP), and various combinations of the foregoing.

A device 108 may be configured to establish one or more communication sessions using, for example, IP based communication, universal datagram protocol (UDP) based communication, transmission control protocol (TCP) based communication, TCP/IP based communication, file transfer protocol (FTP) communication, and/or hyper-text markup language (HTML) based communication. Example data that may be exchanged and/or transmitted via a communication session includes, but is not limited to, digital pictures, audio, video, data files, website information, etc. Communication sessions may also be used to send and/or exchange any number and/or type(s) of participant information (e.g., a conference call participant identification number, a password, a personal identification number (PIN), a user name, and/or a phone number).

Conference call communication sessions may be initiated and/or established during and/or after the establishment of a communication session, and as directed and/or initiated by a user of device 108. For example, a participant may join a conference call from a device 108 by pressing one or more general purpose and/or dedicated keys and/or buttons of an input interface, such as a keyboard, keypad, and/or touch screen, and/or by dialing the call-in telephone number and entering an authorization code. A device 108 then responds to the user input by establishing a connection to the conference call based on, for example, the call-in telephone number and/or an IP address of conference call manager 102 stored in the memory of the device or as entered by the participant. Conference call manager 102 may be located at a company associated with one or more of the conference call participants, and/or may be located at a third-party conference call service provider.

In an example, communication network 106 includes an interface to and/or contain a portion of a Voice Over IP (VOIP) network. In an example, communication network 106 includes an interface to and/or contain a portion of a public switched telephone network (PSTN), and an interface to and/or contain a portion of a public land-mobile network (PLMN). Additionally or alternatively, communication network 106 may include an interface to and/or contain a portion of any other type(s) of communication networks. For example, using any type(s) of technique(s), method(s), protocol(s) and/or technology(-ies), a gateway and the PSTN may facilitate telephone calls between a PSTN-based phone (not shown) and any of the example devices 108. A gateway may be implemented by and/or within communication network 106. A gateway may be associated with communication network 106, the PLMN, the PSTN and/or any other communication network.

The PLMN and/or the PSTN may be implemented by any type(s) of communication device(s), switch(es), protocol(s), system(s) and/or technology(-ies). For instance, the example PLMN may include one or more cellular base stations that can transmit cellular signals to and/or receive cellular signals from a cellular communication device using any type(s) of protocols (e.g., time-divisional multiple access (TDMA), code-divisional multiple access (CDMA), etc.).

Device(s) 108 may be communicatively coupled to communication network(s) 106 via any type(s) of public and/or private network, such as the Internet. However, any type(s) of current and/or future communication network(s), communication system(s), communication device(s), transmission medium(s), protocol(s), technique(s) and/or standard(s) could be used to communicatively couple devices 108 to one or more of communication networks 106. Device(s) 108 may be coupled to communication network 106 via any type(s) of current and/or future device(s), technology(-ies)

and/or method(s), including voice-band modem(s), digital subscriber line (DSL) modem(s), cable modem(s), Ethernet transceiver(s), optical transceiver(s), virtual private network (VPN) connection(s), Institute of Electrical and Electronics Engineers (IEEE) 802.11x (a.k.a. WiFi) transceiver(s), IEEE 802.16 (a.k.a. WiMax), access point(s), access provider network(s), etc. Moreover, communication network 106 may extend geographically to include a location near to and/or encompassing one or more devices 108. For example, communication network 106 and/or a public and/or private access provider network (e.g., access provider network) may include a wireless access point (not shown) by which, for example, an IP phone connects to communication network 106.

Device(s) 108 may be communicatively coupled to an access provider and/or communication network 106 via any type(s) of public and/or private local area networks (LANs) located within, for example, a residence, school and/or place of business, and/or via any type(s) of router(s), bridge(s) and/or gateway(s) located within and/or coupled to such public and/or private locations and/or LANs.

Communication system 100 may include additional devices (e.g., servers, systems, gateways, portals, and/or processors) than those illustrated in FIG. 1 and/or may include more than one of any or all of the illustrated communication networks, access provider networks, devices, systems, and/or gateways. Additionally, communication networks 106, device(s) 108, servers, systems, gateways, portals, and/or processors included in communication system 100 may be combined, re-arranged, divided, eliminated and/or implemented in any of a variety of ways. For example, conference call manager 102 and/or the components or devices thereof may be implemented by and/or within a common server or on distributed servers. Further, device(s) 108, conference call manager 102, and/or, more generally, communication networks 106 may be implemented by hardware, software, firmware and/or any combination thereof.

Figure 2:
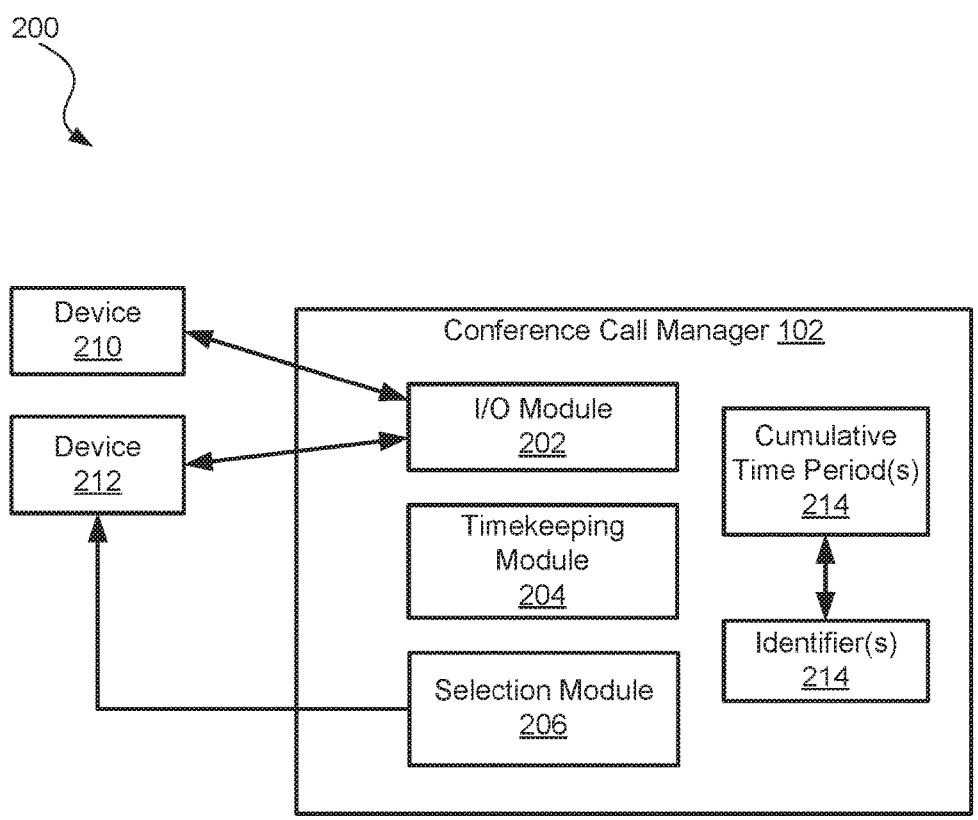
FIG. 2 is an example system architecture for managing a conference call.

FIG. 2 is an example block diagram 200 for managing a conference call. In FIG. 2, conference call manager 102 includes an input/output (I/O) module 202, timekeeping module 204, and selection module 206. I/O module 202 receives audio signals from participants attempting to speak on the conference call. In an example, I/O module 202 listens for noise level on the connections between each device used by a participant and conference call manager 102. In FIG. 2, I/O module 202 may receive an audio signal from a device 210 used by a first participant on the conference call and an audio signal from a device 212 used by a second participant on the conference call.

Timekeeping module 204 may keep track of how much time each participant is speaking on the conference call. Timekeeping module 204 may determine that a participant is attempting to speak if the audio signal from a device used by the participant is detected. In the present disclosure, an audio signal detected from a device may interchangeably refer to an audio signal detected by the participant using the device. Timekeeping module 204 may assign an identifier 214 to each participant, where each participant is assigned a different identifier compared to each other. For one or more participants on the conference call, timekeeping module 204 may keep track of a cumulative time period 216 in which the respective participant has spoken on the conference call. In an example, timekeeping module 204 may maintain a counter, increment the counter by one for each second the participant speaks on the conference call, and stops incrementing the counter if the participant is no longer speaking on the conference call. In an example, if a participant has spoken on a conference call for 15 seconds, the cumulative time period associated with this participant is 15. If at a later point in time, the participant speaks on the same conference call for 30 seconds, timekeeping module 204 increments the cumulative time period associated with the participant to 45. Timekeeping module 204 may associate each cumulative time period with the identifier assigned to the participant. Accordingly, timekeeping module 204 may keep track of how long each participant has spoken for on the conference call.

Selection module 206 may detect when multiple participants are attempting to speak at the same time. Selection module 206 may be a "referee" that monitors the conference call and detects voice collisions between participants on the conference call. A voice collision occurs when multiple participants speak at the same time on the conference call, which may lead to awkwardness and a determination of who has priority to speak. In an example, selection module 206 detects multiple concurrent audio signals, which include an audio signal from multiple participants on a conference call and indicate that the multiple participants had a "voice collision."

Selection module 206 compares a first cumulative time period in which the first participant has spoken on the conference call to a second cumulative time period in which the second participant has spoken on the conference call. In an example, selection module 206 compares these cumulative time periods by determining whether the first cumulative time period is greater than the second cumulative time period. If the first cumulative time period is greater than the second cumulative time period, then the first participant has spoken for a longer duration on the conference call than the second participant. In this example, it may be desirable to provide the second participant with priority to speak over the first participant. In contrast, if the second cumulative time period is greater than the first cumulative time period, then the second participant has spoken for a longer duration on the conference call than the first participant. In this example, it may be desirable to provide the first participant with priority to speak over the second participant.

During conference calls, a participant may cough, laugh, or sneeze, which may cause audio to be transmitted to and detected by conference call manager 102; these actions of coughing, laughing, and sneezing typically take less than one second. In contrast, it may take at least one second for a participant to say a couple of words. It may be desirable for selection module 206 to detect the multiple concurrent audio signals from participants for a threshold period of time before performing this comparison. For example, selection module 206 may detect a voice collision between participants for at least a threshold period of time (e.g., one, two, or three seconds) before allocating priority to one of these participants.

In some examples, selection module 206 selects, based on the comparison, one of the first participant and the second participant as a lower ranked participant. The lower ranked participant may be the participant that has spoken for a longer cumulative time period than at least one other participant of the multiple participants associated with the voice collision. As discussed, it may be fairer to allocate priority to those participants who have not spoken as much on the conference call compared to others to speak on the conference call. Additionally, it may be more interesting to hear from a participant who has not spoken very much on the conference call.

In an example, selection module 206 provides an indication to the lower ranked participant to yield speaking in favor of another participant on the conference call. The indication may be separate from the audio and/or video stream, which may have additional latency than that solely due to the network transmission time due to being streamed. The indication provided may depend on the device being used by a participant. For example, if a participant is using a Web browser to connect to the conference call, the indication may be a message displayed in the Web browser. In this example, the message may display, "Please allow another participant to speak." In another example, if a participant is using a telephone to connect to the conference call, the indication provided may be an unobtrusive noise that is noticeable enough for the participant to act upon. In order to avoid confusion about this noise, the participants may have been briefed regarding this sound and its meaning. For speakers who joined using a telephone, the short unobtrusive sound may be mixed into the audio stream that they hear; this may lead to additional latency compared to Web browser clients. It seems likely, however, to be much faster than the conversation which would otherwise be held to decide who should go first.

In some examples, selection module 206 selects, based on the comparison, one of the first participant and the second participant as a higher ranked participant. A participant who is not selected as a lower ranked participant may be referred to as a higher ranked participant. The higher ranked participant may be the participant that has not spoken for a longer cumulative time period than at least one other participant of the multiple participants associated with the voice collision. In an example, selection module 206 provides an indication to the higher ranked participant to continue speaking because other participants on the conference call have been requested to allow the higher ranked participant to speak first. The indication provided may depend on the device being used by a participant. For example, if a participant is using a telephone to connect to the conference call, the indication may be an unobtrusive noise that is noticeable enough for the participant to act upon. In order to avoid confusion about this noise, the participants may have been briefed regarding this indication to continue speaking and provided sound. In another example, if a participant is using a Web browser to connect to the conference call, the indication may be a message displayed in the Web browser. In this example, the message may display, "Please continue speaking. Other participants have been told that you have priority to speak right now."

Figure 3:
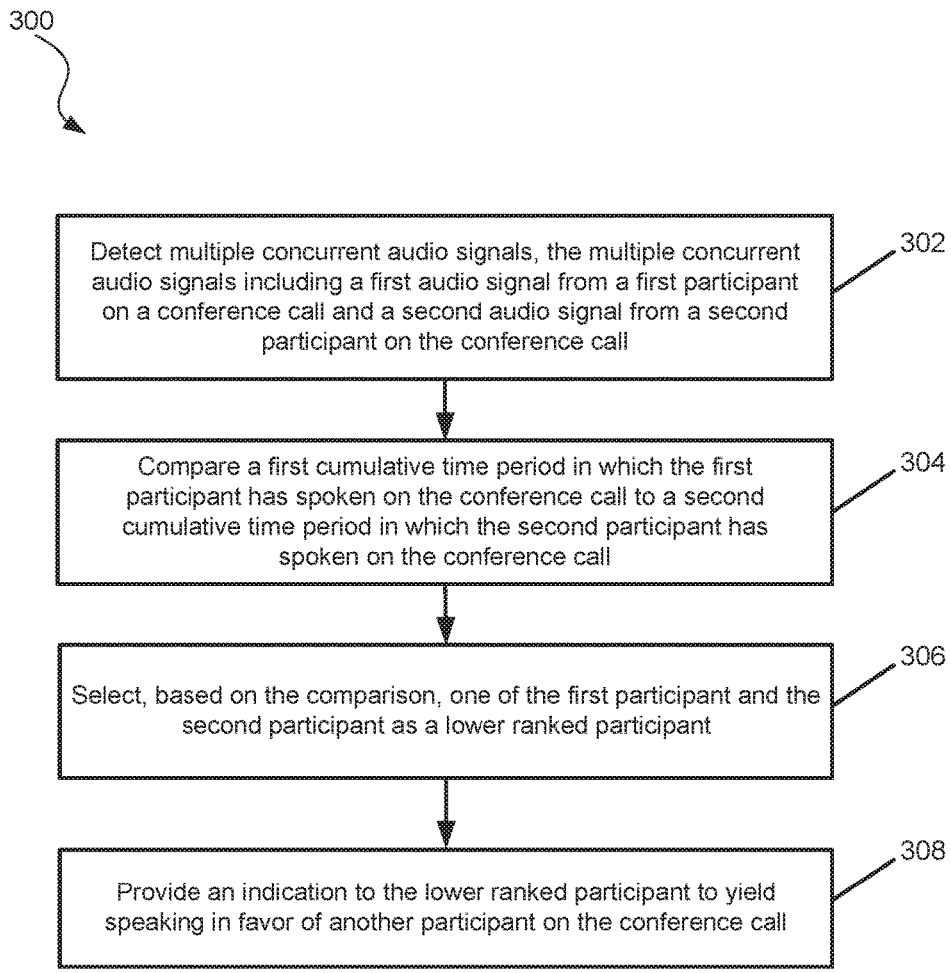
FIG. 3 is a flowchart illustrating an example method for managing a conference call.

FIG. 3 is a flowchart illustrating an example method 300 for managing a conference call. Method 300 is not meant to be limiting and may be used in other applications.

In FIG. 3, method 300 includes blocks 302-308. In block 302, selection module 206 detects multiple concurrent audio signals, the multiple concurrent audio signals including a first audio signal from a first participant on a conference call and a second audio signal from a second participant on the conference call. In block 304, selection module 206 compares a first cumulative time period in which the first participant has spoken on the conference call to a second cumulative time period in which the second participant has spoken on the conference call. In block 306, selection module 206 selects, based on the comparison, one of the first participant and the second participant as a lower ranked participant. In block 308, selection module 206 provides an indication to the lower ranked participant to yield speaking in favor of another participant on the conference call.

In some examples, one or more actions illustrated in blocks 302-308 may be performed for any number of multiple current audio signals received. Additionally, it is also understood that additional processes may be inserted before, during, or after blocks 302-308 discussed above. It is also understood that one or more of the blocks of method 300 described herein may be omitted, combined, or performed in a different sequence as desired.

In an example, the conference call leader may enable or disable the selection module 206 from performing these actions. The conference call leader may enable/disable these features when the call is created or intermittently as the conference call is ongoing. The conference call leader may turn these features on, for example, if an important discussion is about to ensue and the conference call leader wants to make sure that everyone has an opportunity to speak.

Selection module 206 may use other techniques to select the lower ranked participant or the higher ranked participant different from those discussed above. In an example, selection module 206 assigns a random number to each of the participants on the conference call and randomly selects one of these numbers. In this example, the participant assigned the selected number is selected to be the lower and/or higher ranked participant. If more than two participants are involved in the voice collision, selection module 206 may rank the participants in the order which their numbers are selected. In some examples, the random number assigned to a participant may also be the participant's identifier 214. Selection module 206 may assign a number to participants based on the order in which the participants join the conference call, based on seniority of the participants, based on time zone of the participants, etc.

In another example, the participants involved in the voice collision may send an indication to conference call manager 102 that the participant would like to continue speaking. In an example, the participant presses a button on the user's device or coupled to the user's device, and the button press causes this indication that the participant would like to continue speaking to be sent to conference call manager 102. If the participant has connected to the conference call using a telephone, the participant may enter in a code to provide this indication or say a particular word or phrase, such as "Requesting Priority." In another example, if the participant has connected to the conference call using a Web browser, the participant may select an option displayed in the Web browser to provide this indication (e.g., a user-selection option that displays "Request Priority to Speak").

Figure 4:
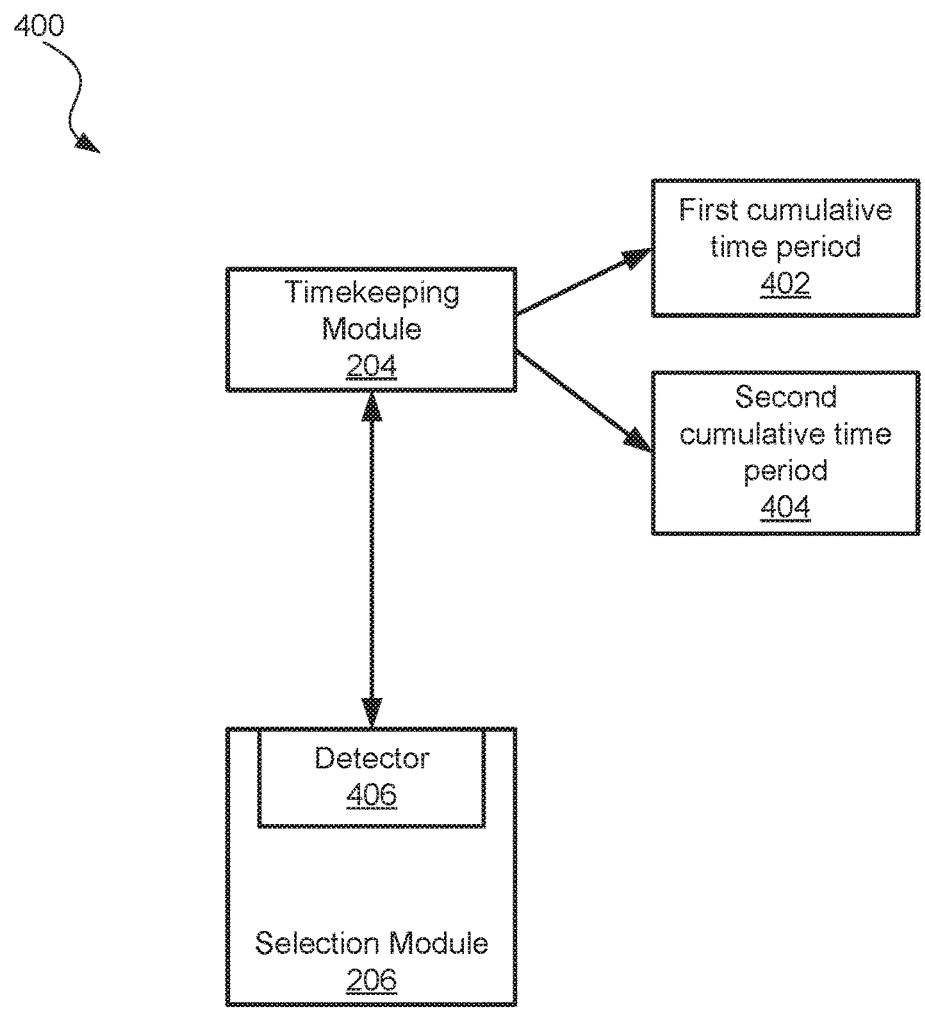
FIG. 4 is an example system diagram for managing a conference call.

FIG. 4 is an example system diagram 400 for managing a conference call. Method 400 is not meant to be limiting and may be used in other applications. In FIG. 4, timekeeping module 204 maintains a first cumulative time period 402 in accordance with one or more audio signals received from a first communications device used by a first participant to connect to the conference call. In an example, first cumulative time period 402 indicates how long the first participant has spoken on the conference call. Additionally, timekeeping module 204 maintains a second cumulative time period 404 in accordance with one or more audio signals received from a second communications device used by a second participant to connect to the conference call. In an example, second cumulative time period 404 indicates how long the second participant has spoken on the conference call.

Selection module 206 includes a detector 406 that detects concurrent audio signals associated with multiple participants (e.g., the first and second participants). The concurrent audio signals from multiple participants are an indication of voice collision between them. In an example, selection module 206 detects the multiple concurrent audio signals if detector 406 receives the first audio signal from the first participant and second audio signal from the second participant during the same time period (e.g., overlapping time periods).

Selection module 206 selects, based on first cumulative time period 402 and second cumulative time period 404, one of the first participant and the second participant as a lower ranked participant. In an example, selection module 206 compares first cumulative time period 402 to second first cumulative time period 404 by determining whether first cumulative time period 402 is greater than second cumulative time period 404. In an example, selection module 206 selects the participant associated with a lower cumulative time period as the lower ranked participant. Selection module 206 may select the first participant as the lower ranked participant if first cumulative time period 402 is greater than second cumulative time period 404. In contrast, selection module 206 may select the second participant as the lower ranked participant if first cumulative time period 402 is not greater than second first cumulative time period 404. Selection module 206 may store first cumulative time period 402 and second cumulative time period 404 into a memory coupled to the conference call manager 102, and may update the memory with updated cumulative time periods.

Selection module 206 provides an indication to the lower ranked participant to yield speaking in favor of one or more participants on the conference call. The indication may include sending a visual message and/or an audible message to the lower ranked participant. In some examples, selection module 206 also sends an indication to the higher ranked participant that other participants have been requested to yield speaking in favor of the participant. Additionally, selection module 206 may send one or more indications to the lower ranked participant, and a type of the one or more indications depends on a device used by the lower ranked participant to connect to the conference call.

As discussed above and further emphasized here, FIGS. 1-4 are merely examples, which should not unduly limit the scope of the claims. For example, it should be understood that a voice collision may include more than two participants on the conference call. In this example, selection module 206 may select at least two lower ranked participants.

Figure 5:
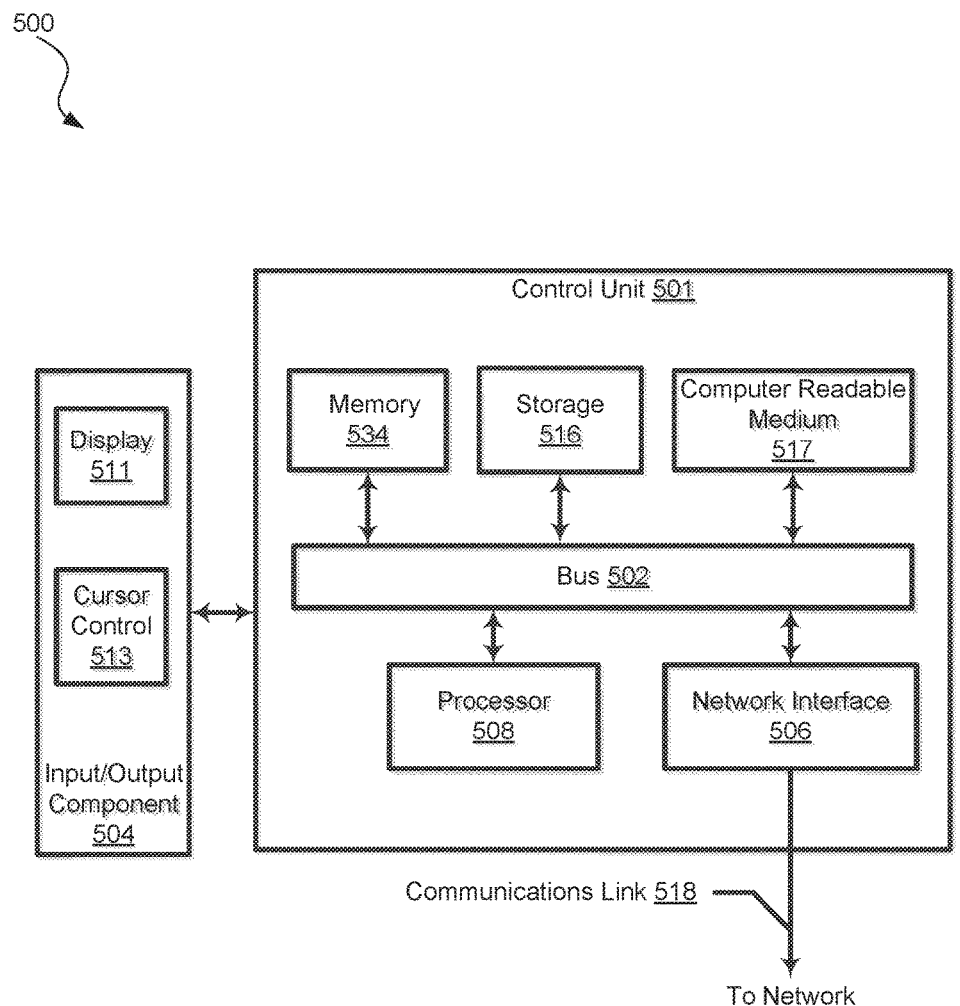
FIG. 5 is a block diagram of an electronic system suitable for implementing one or more examples of the present disclosure.

FIG. 5 is a block diagram of a computer system 500 suitable for implementing one or more examples of the present disclosure. In various implementations, computer system 500 corresponds to device(s) 108 and/or conference call manager 102. Computer system 500 includes a plurality of processors and may additionally include one or more storage devices each selected from a group including floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the computer system 500 using a computer network (not shown). The computer network may be any type of network including a LAN, a WAN, an intranet, the Internet, a cloud, and/or any combination of networks thereof that is capable of interconnecting computing devices and/or computer programs in the system.

Computer system 500 includes a bus 502 or other communication mechanism for communicating information data, signals, and information between various components of computer system 500. Components include an I/O component 504 that processes a user action, such as selecting keys from a keypad/keyboard, selecting one or more buttons or links, etc., and sends a corresponding signal to bus 502. In an example, a user may enter in the information to connect to the conference call using I/O component 504. I/O component 504 may also include an output component such as a display 511, and an input control such as a cursor control 513 (such as a keyboard, keypad, mouse, etc.). In an example, selection module 206 may provide the indication to the lower ranked participant to yield speaking in favor of another participant on the conference call via the display 511.

A transceiver or network interface 506 transmits and receives signals between computer system 500 and other devices via a communications link 518 to a network. In an example, the transmission is wireless, although other transmission mediums and methods may also be suitable. A processor 508, which may be a micro-controller, digital signal processor (DSP), or other processing component, processes these various signals, such as for display on computer system 500 or transmission to other devices via communications link 518. Processor 508 may also control transmission of information, such as cookies or IP addresses, to other devices.

Components of computer system 500 also include a system memory component 534 (e.g., RAM), a static storage component 516 (e.g., ROM), and/or a disk drive 517. System memory component 534 may include memory 534. Computer system 500 performs specific operations by processor 508 and other components by executing one or more sequences of instructions contained in system memory component 534. Logic may be encoded in a computer readable medium, which may refer to any medium that participates in providing instructions to processor 508 for execution. Such a medium may take many forms, including but not limited to, non-volatile media, volatile media, and transmission media.

In various implementations, non-volatile media includes optical, or magnetic disks, or solid-state drives, volatile media includes dynamic memory, such as system memory component 534, and transmission media includes coaxial cables, copper wire, and fiber optics, including wires that include bus 502. In an example, the logic is encoded in non-transitory computer readable medium. In an example, transmission media may take the form of acoustic or light waves, such as those generated during radio wave, optical, and infrared data communications. Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various examples, execution of instruction sequences (e.g., method 300) to practice the present disclosure may be performed by computer system 500. In various other examples, a plurality of computer systems 500 coupled by communication links 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various examples provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various steps, blocks, or actions described herein may be changed, combined into composite steps, composite blocks, or composite actions, and/or separated into sub-steps, sub-blocks, or sub-actions to provide features described herein.

The foregoing disclosure is not intended to limit the present disclosure to the precise forms or particular fields of use disclosed. As such, it is contemplated that various alternate examples and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A method for managing a conference call, comprising:
   detecting, by an input/output (I/O) module, multiple concurrent audio signals, the multiple concurrent audio signals including a first audio signal from a first communications device coupled to a conference call and a second audio signal from a second communications device coupled to the conference call, a first participant being located remotely from the second participant and using the first communications device to communicate with one or more participants on the conference call, and a second participant using the second communications device to communicate with one or more participants on the conference call;
   tracking, by a time keeping module, a first cumulative time period in which audio signals from the first communications device are received and a second cumulative time period in which audio signals from the second communications device are received, the time keeping module being remote from at least one of the first and second communications devices;
   determining whether the multiple concurrent audio signals are detected for a threshold period of time; and
   in response to a determination that the multiple concurrent audio signals are detected for the threshold period of time:
      comparing the first cumulative time period to the second cumulative time period;
      selecting, based on the comparison of the first and second cumulative time periods, one of the first participant and the second participant as a lower ranked participant, wherein if the first participant is selected, the second participant is a higher ranked participant, and if the second participant is selected, the first participant is the higher ranked participant; and
      providing an indication to the lower ranked participant to yield speaking in favor of the higher ranked participant, wherein the indication to the lower ranked participant includes at least one of a visual message or an audible message.

2. The method of claim 1, wherein the conference call is a video conference call.

3. The method of claim 1, wherein the conference call is a telephonic conference call.

4. The method of claim 1, further comprising:
   maintaining the first cumulative time period in accordance with one or more audio signals received from the first communications device used by the first participant to connect to the conference call; and
   maintaining the second cumulative time period in accordance with one or more audio signals received from the second communications device used by the second participant to connect to the conference call.

5. The method of claim 1, wherein detecting multiple concurrent audio signals includes receiving the first audio signal and second audio signal during the same time period.

6. The method of claim 1, wherein a length of the time period exceeds the threshold period of time.

7. The method of claim 1, wherein comparing the first cumulative time period to the second first cumulative time period includes determining whether the first cumulative time period is greater than the second cumulative time period.

8. The method of claim 7, wherein selecting the lower ranked participant includes selecting the first participant if the first cumulative time period is greater than the second cumulative time period, and selecting the second participant if the first cumulative time period is not greater than the second first cumulative time period.

9. The method of claim 1, further comprising:
   providing an indication to the higher ranked participant that at least one participant on the conference call has been requested to yield speaking in favor of the higher ranked participant.

10. The method of claim 1, further comprising:
    receiving an indication from the first communications device that the first participant would like to continue speaking on the conference call, wherein the indication from the first communications device includes a code entered by the user into the first communications device.

11. A system for managing a conference call, comprising:
    a timekeeping module that maintains, by one or more hardware processors, first cumulative time period indicating how long a first participant has spoken on a conference call and maintains, by one or more hardware processors, a second cumulative time period indicating how long a second participant has spoken on the conference call; and
    a selection module that detects, by one or more hardware processors, concurrent audio signals associated with the first and second participants and determines whether the concurrent audio signals are detected for a threshold period of time, wherein in response to a determination that the concurrent audio signals are detected for the threshold period of time, the selection module compares the first cumulative time period to the second cumulative time period, selects, based on the comparison of the first and second cumulative time periods, one of the first participant and the second participant as a lower ranked participant, and provides an indication to the lower ranked participant to yield speaking in favor of a higher ranked participant, wherein if the first participant is selected as the lower ranked participant, the second participant is the higher ranked participant, and if the second participant is selected as the lower ranked participant, the first participant is the higher ranked participant, and wherein the indication includes at least one of a visual message or an audible message.

12. The system of claim 11, further comprising:
a memory for storing the cumulative time periods in which participants have spoken on the conference call; and
a timekeeping module updates the memory with updated cumulative time periods.

13. The system of claim 11, comprising:
an input/output (I/O) module that receives audio signals from the first and second participants.

14. The system of claim 11, wherein the multiple concurrent audio signals include a first audio signal from the first participant and a second audio signal from the second participant.

15. The system of claim 11, wherein the conference call is a video conference call.

16. The system of claim 11, wherein the conference call is a telephonic conference call.

17. The system of claim 11, wherein the selection module sends one or more indications to the lower ranked participant, and a type of the one or more indications depends on a device used by the lower ranked participant to connect to the conference call.

18. The system of claim 11, wherein the selection module selects the participant associated with a higher cumulative time period as the lower ranked participant.

19. A non-transitory machine-readable medium comprising a plurality of machine-readable instructions that when executed by one or more processors is adapted to cause the one or more processors to perform a method comprising:
detecting multiple concurrent audio signals, the multiple concurrent audio signals including a first audio signal from a first participant on a conference call and a second audio signal from a second participant on the conference call;
tracking, by a time keeping module, a first cumulative time period in which audio signals from the first communications device are received and a second cumulative time period in which audio signals from the second communications device are received, the time keeping module being remote from at least one of the first and second communications devices;
determining whether the multiple concurrent audio signals are detected for a threshold period of time; and
in response to a determination that the multiple concurrent audio signals are detected for the threshold period of time:
comparing the first cumulative time period to the second cumulative time period;
selecting, based on the comparison of the first and second cumulative time periods, one of the first participant and the second participant as a lower ranked participant, wherein if the first participant is selected, the second participant is a higher ranked participant, and if the second participant is selected, the first participant is the higher ranked participant; and
providing an indication to the lower ranked participant to yield speaking in favor of the higher ranked participant, wherein the indication includes at least one of a visual message or an audible message.

20. The system of claim 11, wherein the selection module receives an indication from the first participant that the first participant would like to continue speaking on the conference call.

* * * * *